(12) United States Patent
Scheib

(10) Patent No.: US 7,175,203 B2
(45) Date of Patent: Feb. 13, 2007

(54) VEHICLE FRAME ASSEMBLY

(75) Inventor: Charles Joseph Scheib, Kettering, OH (US)

(73) Assignee: Delphi Technologies, Inc., Troy, MI (US)

( * ) Notice: Subject to any disclaimer, the term of this patent is extended or adjusted under 35 U.S.C. 154(b) by 144 days.

(21) Appl. No.: 11/079,444

(22) Filed: Mar. 14, 2005

(65) Prior Publication Data

US 2006/0202464 A1    Sep. 14, 2006

(51) Int. Cl.
*B62D 21/00* (2006.01)
(52) U.S. Cl. .................. 280/781; 280/784; 280/785
(58) Field of Classification Search .......... 280/784, 280/781, 785; 296/203.01, 204, 205, 70; 180/90; 403/21, 292, 297, 305, 314, 341, 403/345, 375, 408.1, 409.1
See application file for complete search history.

(56) References Cited

U.S. PATENT DOCUMENTS 5,195,779 A * 3/1993 Aoyama et al. ............ 280/784
5,282,637 A * 2/1994 McCreadie ............ 296/203.02
6,793,248 B1 * 9/2004 Sung ..................... 280/781

* cited by examiner

*Primary Examiner*—Eric Culbreth
(74) *Attorney, Agent, or Firm*—Patrick M. Griffin

(57) ABSTRACT

In a vehicle frame, a console frame structure is assembled to a chassis or main frame structure using a flap retainer. The chassis includes a bracket having a slot with a forward closed end and a rear open end. The console frame structure includes a post that is inserted into the slot for assembly. A flap retainer is attached to the bracket adjacent the slot and includes a fixed portion attached near the closed end and a free portion adjacent the open end. The flap retainer defines an opening sized and shaped for receiving the post. During assembly, the flap retainer flexes so that the free portion is spaced apart from the open end of the slot to allow the post to be inserted. The flap retainer returns to a retaining position to capture the post within the opening of the flap retainer. In the event of a vehicle impact, the flap retainer secures the post to prevent the console frame structure from becoming dislodged.

9 Claims, 2 Drawing Sheets

VEHICLE FRAME ASSEMBLY

TECHNICAL FIELD OF INVENTION

This invention relates to a vehicle frame assembly formed of a first frame structure having slot and a second frame structure comprising a post received in the slot. More particularly, this invention relates to such vehicle frame assembly that further comprises a flap retainer that flexes to allow the post to be inserted into the slot and then snaps about the post to lock the post within the slot.

BACKGROUND OF THE INVENTION

A popular design for a passenger compartment of an automotive vehicle comprises bucket seats for a driver and a front occupant spaced apart by a console. The console may include a gearshift lever and one or more storage compartments. The console is attached to the chassis of the vehicle. More particularly, in a common construction, the chassis includes a crossbeam perpendicular to the longitudinal axis of the vehicle, which is located underneath the instrument panel and includes brackets that extend toward the floor. The console comprises a metal frame covered by a polymeric skin. During assembly, posts on the console frame are axially inserted into slots in the brackets. The posts are inserted in a forward direction, i.e., toward the front of the vehicle, and are positioned against closed forward ends of the slots. In the event of an impact, the closed front end of the slot prevents the console frame from being dislodged. This is particularly effective in the event of a frontal impact, wherein the momentum of the console is directed forward. In the event of a rear impact, forces may cause the console frame to move rearward relative to the brackets, whereupon the posts may become dislodged from the slots. Once dislodged, the console frame may move in an unpredictable and potentially dangerous manner.

Therefore, a need exists for a vehicle frame assembly that includes a frame substructure, such as a console frame, having posts inserted within open slots of a vehicle frame in a manner that allows the chassis to be readily assembled during vehicle manufacture, and prevent the frame substructure from being dislodged in the event of impact.

SUMMARY OF THE INVENTION

This invention provides a vehicle frame that includes a first frame structure and a second frame structure. The first frame structure comprises a bracket having a slot that extends between an open end and a closed end. The second frame structure comprise a post received in the slot. A flap retainer is disposed adjacent the slot and includes a fixed portion attached to the bracket adjacent the closed end and a free portion adjacent the open end. The flap retainer defines an opening sized and shaped for receiving the post when the post is inserted into the slot. The flap retainer is flexible between a distended position wherein the free portion is spaced apart from the open end to allow the post to be inserted into the slot through the open end and a retaining position wherein the free portion is adjacent the open end with the post received in the opening therein. During assembly of the first frame structure and the second frame structure, the post is aligned with the slot and advanced, whereupon the flap retainer flexes to allow the post to be inserted into the slot and then returns to the retaining position to capture the post within the opening of the flap retainer. In the event of a vehicle impact, the flap retainer secures the post to prevent the second frame structure from becoming dislodged from the first frame structure.

BRIEF DESCRIPTION OF THE DRAWINGS

This invention will be further described with reference to the accompanying drawings in which.

DETAILED DESCRIPTION OF A PREFERRED EMBODIMENT

Figure 1:
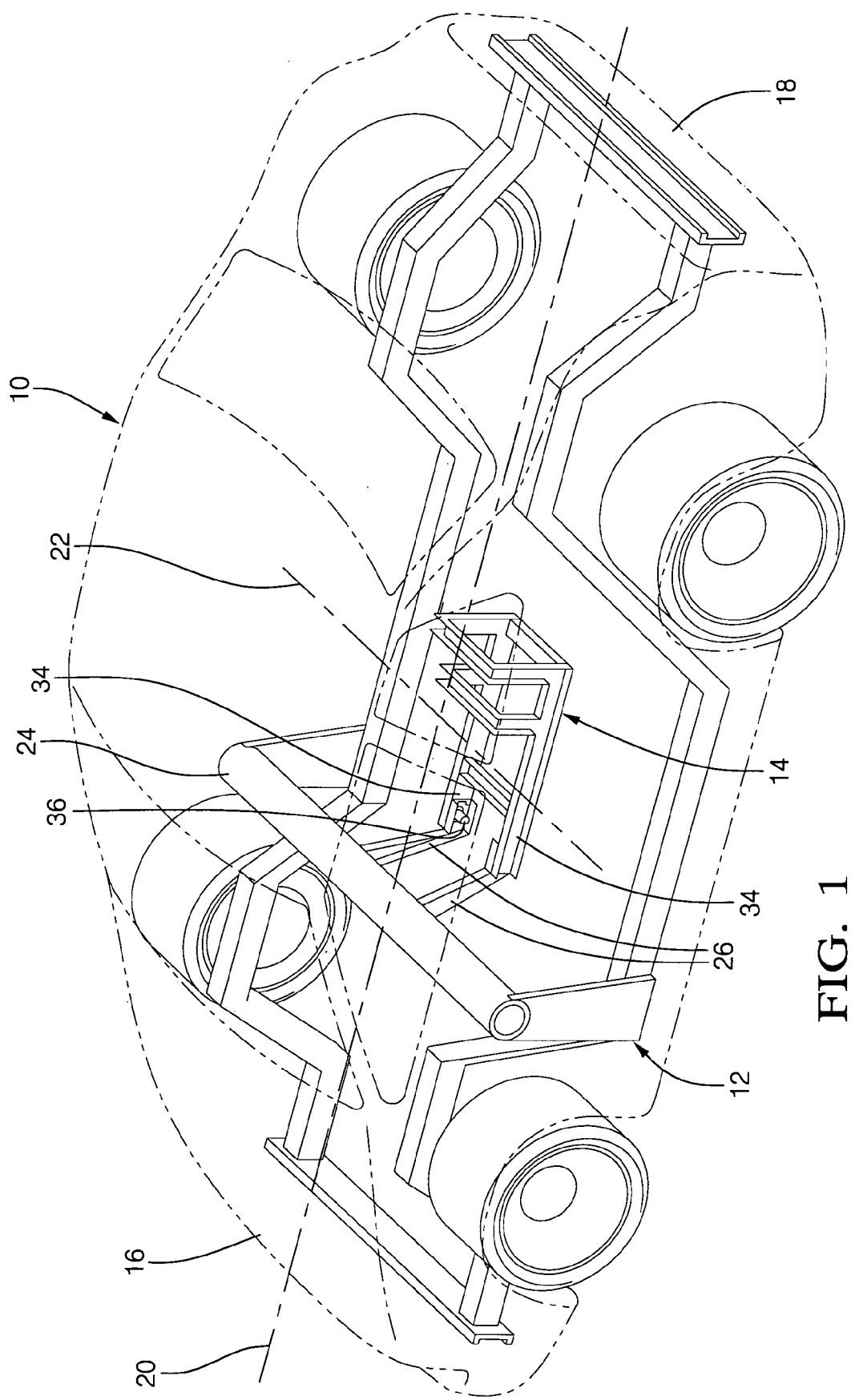
FIG. 1 is a prospective view of a frame for a vehicle.

In accordance with a preferred embodiment of this invention, referring to the Figs., an automotive vehicle 10 comprises a first frame structure, which is main frame or chassis 12 in the depicted embodiment, and a second frame structure, which is console frame 14. It is helpful in understanding this invention to appreciate that vehicle 10 has a front 16, a rear 18, a longitudinal axis 20 corresponding to the normal direction of travel of the vehicle, and a lateral direction 22 perpendicular to axis 20. Vehicle 10 includes a passenger compartment and a console within the passenger compartment between occupant seats. The console includes a polymeric shell that covers console frame 14 and may include storage compartments and other convenience features. FIG. 1 depicts console frame 14 while omitting the shell, seats and other features of the passenger compartment for purposes of clarity.

Figure 2:
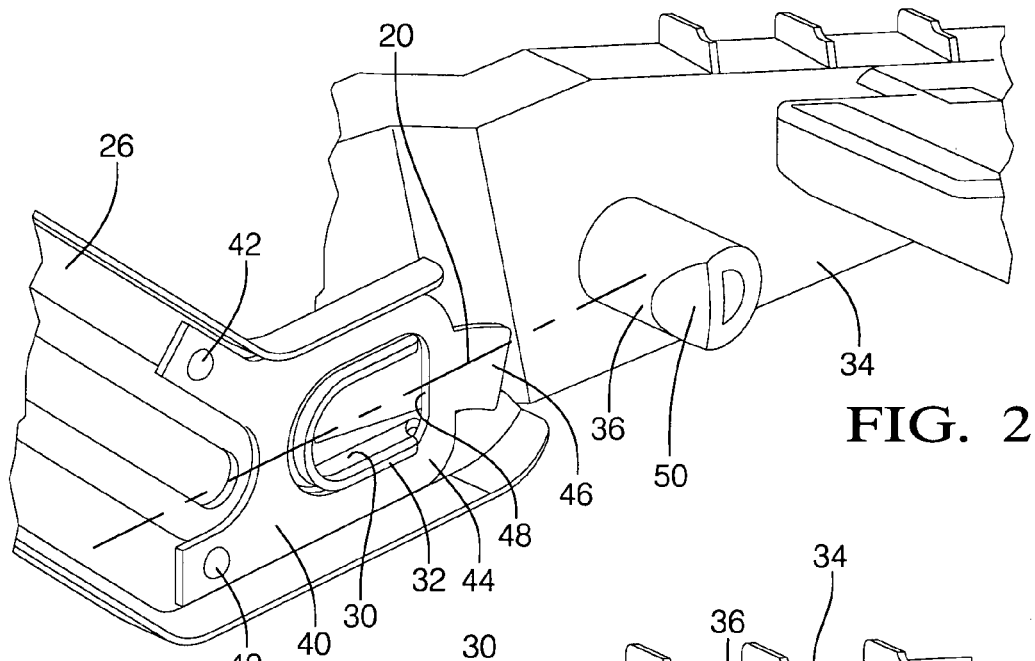
FIG. 2 is prospective view showing details of the frame structures in FIG. 1 in accordance with this invention, prior to assembly.
Figure 3:
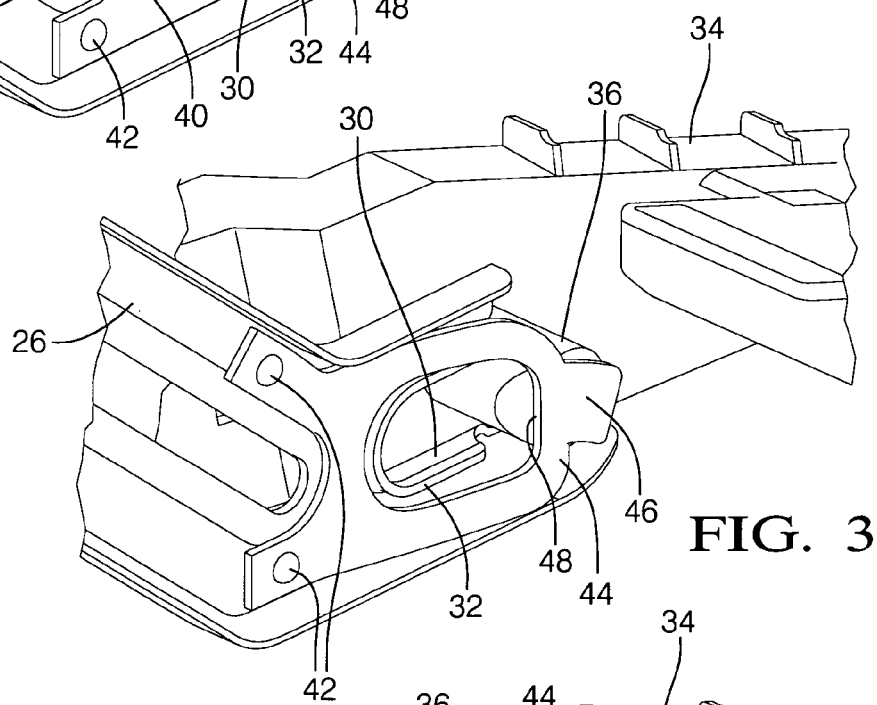
FIG. 3 is a prospective view similar to FIG. 2 showing the frame structures during assembly.
Figure 4:
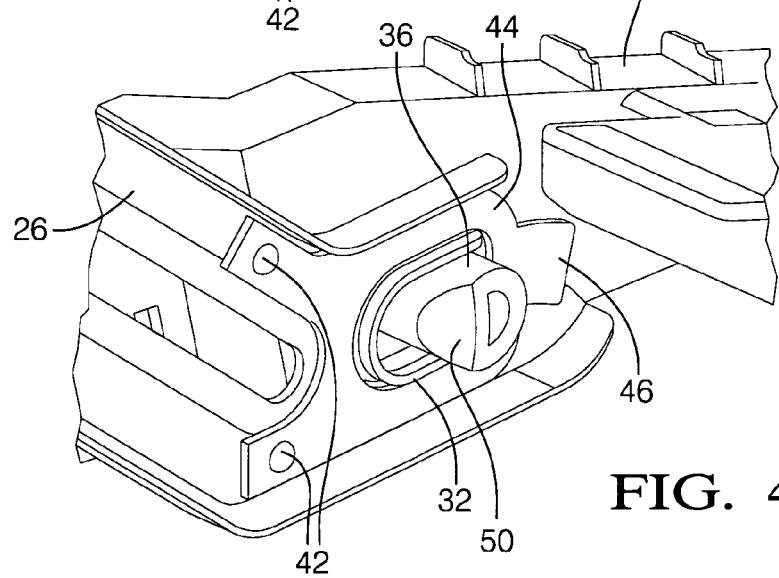
FIG. 4 is a prospective view similar to FIG. 2 showing the frame structures following assembly.

Chassis 12 comprises crossbeam 24 that extends across the front of the passenger compartment perpendicular to axis 20 underneath the instrument panel (not shown). Brackets 26 depend from crossbeam 24 toward the floor of the passenger department. Referring more particularly to FIGS. 2–4, the lower section of each bracket 26 includes a U-shaped slot 30 that is axially elongated between a forward closed end and a rear open end. Brackets 26 are preferably formed of stamped metal sheet and include a lip 32 about slot 30 for reinforcement.

Console frame 14 comprises longitudinal beams 34 and lateral posts 36 that are welded or suitably secured to beams 34 and sized to be received into slots 30.

In accordance with this invention, the assembly includes a flap retainer 40 that is attached to bracket 26 and defines an opening 48 that surrounds slot 30 and post 36 to capture the post within the slot. Retainer 40 is preferably formed of a steel plate, but may be suitably formed of other flexible sheet metal or polymeric material. Retainer 30 is attached to brackets 26 by rivets 42 adjacent the forward closed front end of slot 30, and includes a free end 44 adjacent the rear open end of the slot. In this manner, the retainer is flexible between a retaining position shown in FIGS. 2 and 4, wherein the retainer is adjacent to the bracket to surround the slot, and a distended position shown in FIG. 3, wherein free end 44 is laterally spaced apart from bracket 26 to allow insertion of post 36 into slot 30. In order to allow the retainer to lie against the bracket in the retaining position, opening 48 is sized to receive lip 32 surrounding the slot. Also, it is significant that the retainer extends continuously at the free end, in contrast to an opening such as for a slot. Thus, free end 44 overlies the open end of slot 30 in the retaining position to prevent axial displacement of the post from the slot. To facilitate assembly, the retainer includes a guide tab 46 that extends at an acute angle relative to axis 20 and engages a beveled surface 50 on post 36 to flex the flap retainer into the distended position, thereby allowing the post to be inserted into the slot.

During assembly, the console frame 14 is arranged with brackets 26 such that post 36 is axially aligned with slot 30, as shown in FIG. 2, and is advanced toward the slot. As the post approaches the slot, tab 46 engages bevel surface 50, whereupon retainer 40 flexes into the distended position shown in FIG. 3 to allow access by post 36 to slot 30. As the post is advanced further, post 36 moves past end 44 of retainer 40, whereupon retainer 40 returns to the retaining positron in FIG. 4, with post 36 received in slot 30 and opening 48. Opening 44 is axially elongated to provide clearance for receiving the post in the flexed orientation.

It is an advantage of the preferred embodiment that the steps to assembly the console frame to the chassis in accordance with this invention duplicate the assembly of a conventional bracket and console frame without the flap retainer. Thus, the flap retainer may be added as part of the subassembly operations to manufacture the console frame, without interfering with manufacturing operations to assemble the vehicle.

In the event of impact to the vehicle, such as with another vehicle or object, the flap retainer in accordance with this invention prevents the console frame from becoming dislodged from the bracket. More particularly, in the event of a front impact, the forward momentum of console frame 14 urges post 36 against the closed end of slot 30, and the post is retained in the slot. In the event of a rear impact, the rearward momentum of console frame 14 tends to shift the console frame away from bracket 16, with the result that post 36 tends to move toward the open end of slot 30. In accordance with this invention, post 36 engages flap retainer 40 and is thereby prevented from exiting the open end of the slot. It is pointed out that the retainer 40 is held against rearward movement by rivets 42, but also by lip 32 disposed within opening 48. As a result, the console frame is prevented from becoming dislodged.

While this invention has been described in terms of the preferred embodiments thereof, it is not intended to be so limited, but rather only to the extent set forth in the claims that follow.

I claim:

1. A vehicle frame comprising
   a first frame structure comprising a bracket that includes a slot, said slot comprising an open end and a closed end opposite the open end;
   a second frame structure comprising a post received in the slot; and
   a flap retainer having a fixed portion attached to the bracket adjacent the closed end and a free portion adjacent the open end, said flap retainer defining an opening for receiving the post and being flexible between a distended position wherein the free portion is spaced apart from the open end to allow the post to be axially inserted into the slot through the open end and a retaining position wherein the free portion is adjacent the open end with the post received in the opening therein.

2. A vehicle frame in accordance with claim 1 wherein free end of the flap retainer overlies the open end of the slot to prevent axial dislodgement of the post from the slot.

3. A vehicle frame in accordance with claim 1 wherein the post comprises a beveled surface, and said flap retainer comprises a tab adapted to engage the free end and to displace the free end so as to flex the flap retainer into the distended position.

4. A vehicle frame in accordance with claim 1 wherein the opening is elongated to facilitate receiving of the post therein.

5. A vehicle frame in accordance with claim 1 wherein the flap retainer is formed of a flexible steel plate.

6. A vehicle frame in accordance with claim 1 further comprising fasteners attaching the fixed portion to the bracket.

7. A vehicle frame in accordance with claim 1 wherein the vehicle frame is adapted for a vehicle comprising a front and a rear, and wherein the closed end is a forward end, and the open end is a rear end.

8. A vehicle frame for a vehicle having a vehicle longitudinal axis extending between a front and a rear, said vehicle frame comprising
   a chassis comprising a crossbeam perpendicular to the vehicle axis and a bracket attached to the crossbeam, said bracket including a slot elongated along the axis and having a front open end and a rear closed end;
   a console frame structure comprising a post perpendicular to the axis and received in the slot; and
   a flap retainer in juxtaposition to the bracket overlying the slot, said flap retainer being attached to the bracket adjacent the forward closed end and having a free portion adjacent the rear open end, said flap retainer defining an axially elongated opening for receiving the post and being flexible between a distended position wherein the free portion is spaced apart from the open end to allow the post to be axially inserted into the slot through the rear open end and a relaxed position wherein the free portion is adjacent the open end with the post received in the opening.

9. A vehicle frame in accordance with claim 8 wherein the flap retainer further comprises a guide tab adjacent the rear open end and adapted to engage the post and to flex the flap retainer into the distended position for inserting the post into the slot.

* * * * *